Patented Dec. 6, 1932

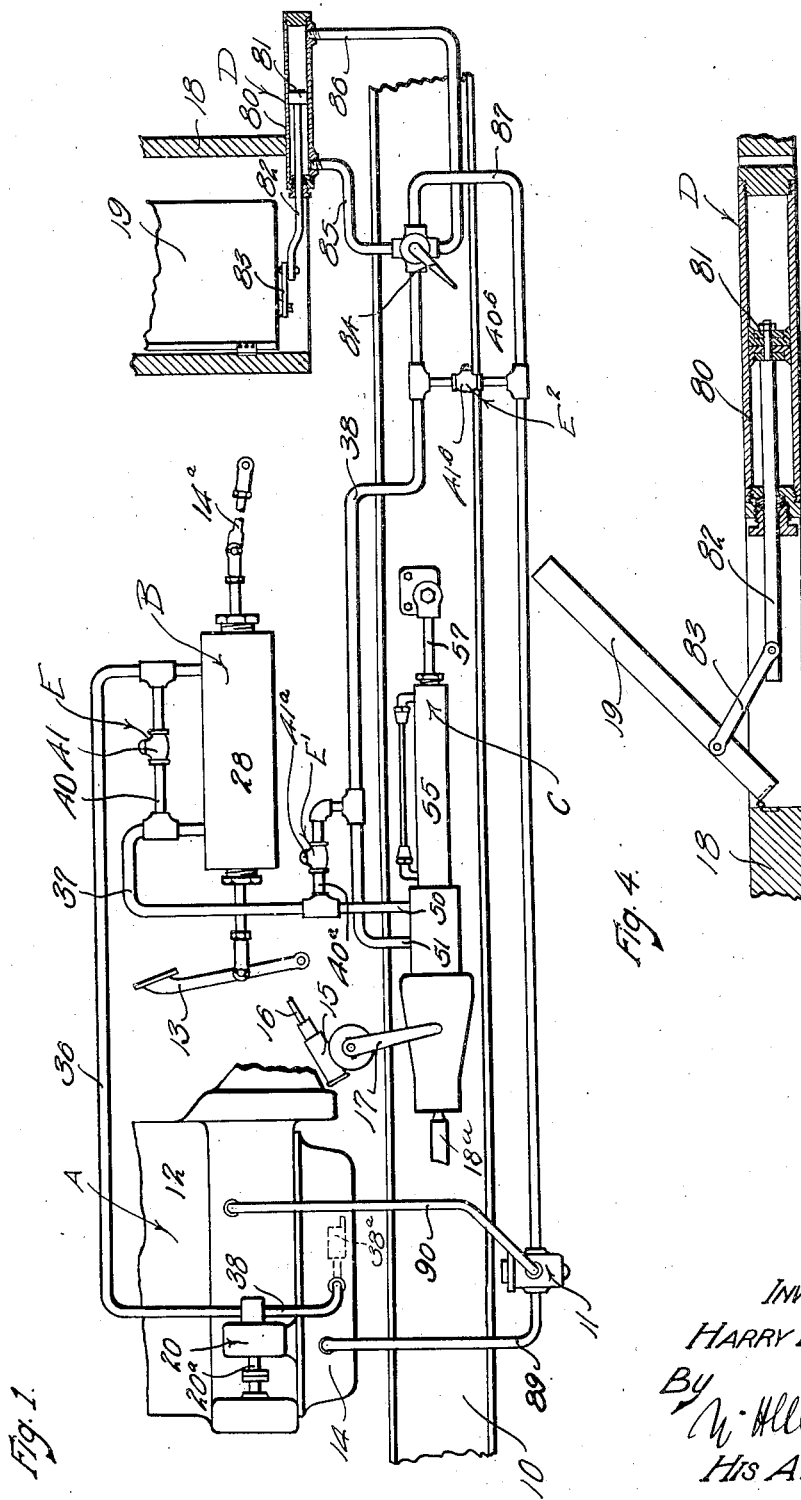

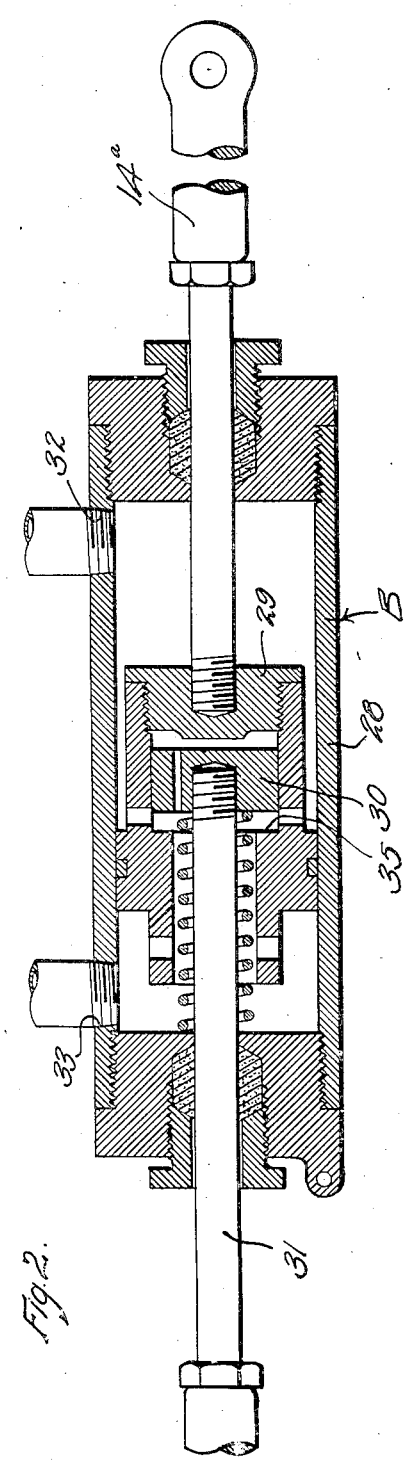
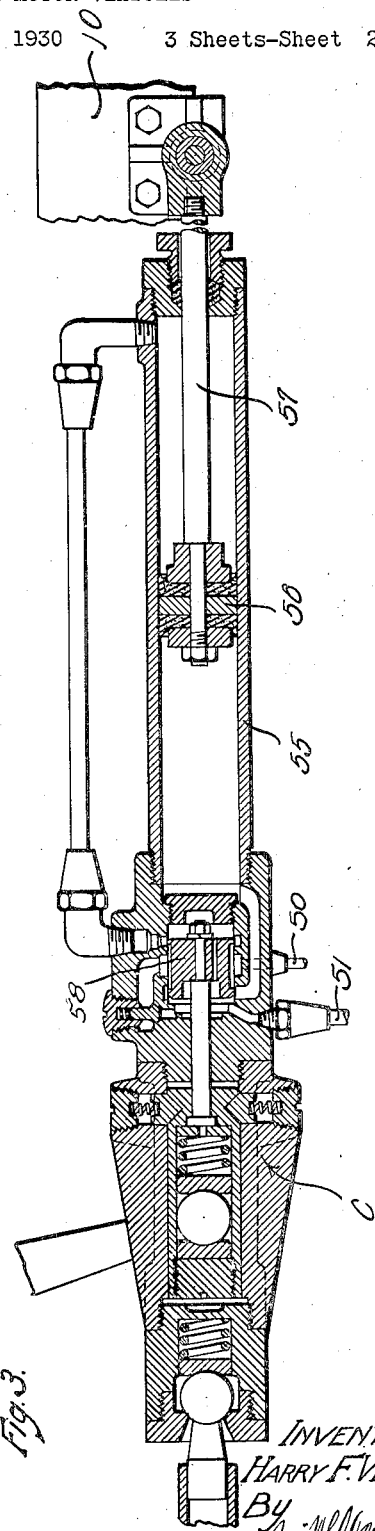

1,890,010

UNITED STATES PATENT OFFICE

HARRY F. VICKERS, OF DETROIT, MICHIGAN

HYDRAULIC APPARATUS FOR MOTOR VEHICLES

Application filed May 19, 1930. Serial No. 453,849.

This invention relates to hydraulic apparatus and it has particular reference to hydraulic apparatus in a motor vehicle. It is a general object of the invention to provide a simple, practical, and dependable system involving the motor or engine of a vehicle and one or more fluid pressure actuated units for operating parts of the vehicle such, for instance, as the steering mechanism, brakes, etc.

It is a general object of the present invention to provide a system relating the motor or internal combustion engine of a vehicle and one or more fluid pressure actuated units so that the unit or units are actuated by fluid employed in the lubrication of the engine.

A further object of the invention is to provide a hydraulic system of the character mentioned in which a single pump is employed to circulate fluid for the operation of the fluid pressure actuated units and for lubrication of the engine of the vehicle.

Another object of the invention is to provide a system of the character mentioned in which the parts are related so that the pump only operates against pressures sufficient to operate the fluid pressure actuated units and supply the lubricant to the engine at the desired pressure. In accordance with the invention the pump normally operates under only enough pressure to effect lubrication of the engine, additional pressures occurring on the pump only when one or more of the fluid pressure actuated units are put in operation.

It is another object of the present invention to provide a construction of the character mentioned in which the units are arranged in series and in which by-passes are provided so that each unit operates under only sufficient pressure to cause its proper operation. By the present invention the pump always operates at the minimum pressure required for the existing condition of operation of the apparatus and does not operate continuously at a maximum or high pressure as is ordinarily the case in apparatus of this character.

A further object of the present invention is to provide apparatus of the character mentioned in which the crank case of the vehicle engine forms the reservoir for the hydraulic system, the lubricating oil of the engine being employed as the fluid medium in the hydraulic system. A feature of the invention is the utilization and circulation of the lubricating oil of the engine in the hydraulic system as the vehicle is thus simplified and the lubricating oil is effectively cooled.

Figure 5:
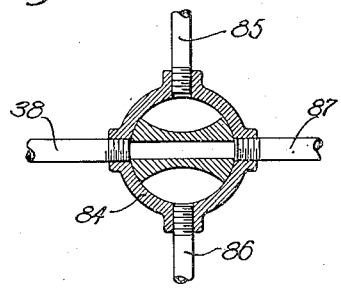
Figure 6:
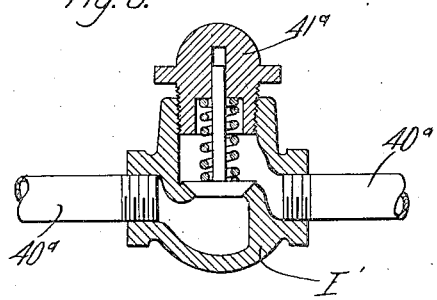
Figure 7:
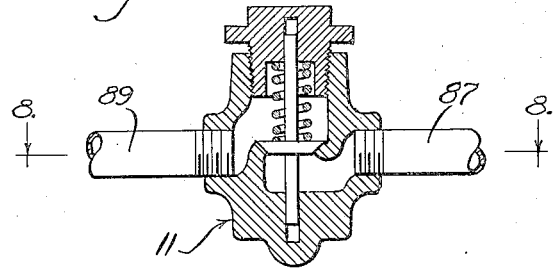
Figure 8:
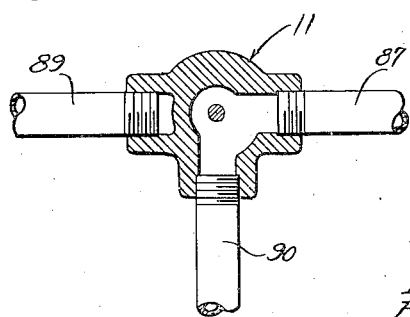

The various objects and features of my invention will be best and more fully understood from the following detailed description of a typical form and application of the invention, throughout which description reference is had to the accompanying drawings, in which:

Fig. 1 is a more or less diagrammatic view illustrating the hydraulic system provided by this invention, being a view showing certain frame and body parts of a typical vehicle, the engine of the vehicle, and several fluid pressure actuated units connected in series, and relates to the engine of the vehicle in accordance with the principles of the present invention. Fig. 2 is an enlarged longitudinal detailed sectional view of the fluid pressure actuated brake operating unit. Fig. 3 is an enlarged longitudinal detailed sectional view of the fluid pressure actuated steering mechanism operating unit. Fig. 4 is an enlarged detailed sectional view of the fluid pressure actuated unit for operating a door. Fig. 5 is a horizontal sectional view of the control valve of one of the units. Fig. 6 is a sectional view of one of the by-pass valves. Figs. 7 and 8 are sectional views of the pressure control valve for the system.

The present invention is intended, generally, for application to or embodiment in a motor vehicle powered by an internal combustion engine. For example, the invention is particularly related to motor vehicles, such as pleasure and commercial cars, busses, trucks, etc. The principal parts and the general features and constructions embodied in motor vehicles are well known to those skilled in the art, and therefore I have eliminated any detailed showing or explanation of such subject matter. In the diagram Fig. 1 I have set forth sufficient parts of a typical motor vehicle to facilitate an understanding of the application and principle of the present invention. I have shown a portion of the vehicle frame 10, the motor or engine A of the vehicle which is ordinarily supported in the frame 10, a brake pedal 13, a steering post 16, steering gear worm mechanism 15, operating arm 17 projecting from the mechanism 15, a drag link 18ª of the steering gear, and a fragmentary part of the body 18 including a door 19. For purpose of example, the motor or engine A of the vehicle may be considered the usual type of internal combustion engine ordinarily employed in motor vehicles of the character hereinabove referred to.

The present invention includes, generally, a pump 20 for handling fluid such as oil, a fluid pressure actuated brake actuating unit B, a fluid pressure actuated steering gear actuating unit C, a fluid actuated door actuating unit D, a pressure regulating device 11 for controlling pressure of the lubricating oil of the engine, and by-passes E, E¹, and E², in combination with the units B, C, and D, respectively.

The engine A of the motor vehicle may be considered the usual type of internal combustion engine including a cylinder block 12, a crank case 14, etc. In accordance with conventional engine construction, the crank case 14 forms a carrier or reservoir holding a substantial quantity of lubricating oil employed in the lubricating system of the engine.

In accordance with the present invention the pump 20 is employed to deliver fluid to the various actuating units of the system and to the lubricating system of the engine A. The pump 20 is preferably driven by and incorporated as a part of the engine A. For instance, it may be operated from a suitable countershaft 20ª of the engine in a manner such as is illustrated in the drawings. The pump is of sufficient size or capacity to properly handle the maximum volume and pressure of fluid required under maximum operating conditions. In practice the pump may be of any suitable type or construction; for purpose of example, it may be stated that the pump may be of the general type or construction disclosed in my co-pending application entitled Vane pump or motor, filed Feb. 25, 1929, Serial No. 342,602. The intake or suction side of the pump is connected by means of a conduit 38 with the crank case 14 of the motor A so that the pump is supplied with the lubricating oil of the engine from the crank case of the engine. In practice a suitable oil filter 38ª may be included in the connection just described to assure delivery of clean oil from the crank case to the pump. The oil handled by the pump is delivered to a conduit 36 which connects with the first fluid pressure actuated unit of the system, in the case illustrated the unit B.

The fluid-pressure actuated unit B is provided to actuate the brake or brakes of the vehicle and is, in a general way, a cylinder and piston mechanism connecting the manually operated member or pedal 13 and brake rod 14ª. In the particular application shown the unit B has a stationary cylinder 28, a piston 29 operable in the cylinder and connected to the rod 14ª, a valve 30 controlling a passage through the unit, and a stem 31 carrying the valve 30 and connected with the foot pedal 13. The cylinder has a fluid inlet opening 32 at one end and a fluid outlet opening 33 at the other end. The fluid delivered to the cylinder through the opening 32 normally passes through a passage or opening formed through the piston 29 and discharges through the outlet opening 33 without operating the piston in the cylinder. A shoulder or seat 35 is formed in the opening through the piston facing the inlet end of the cylinder, and the valve 30 is arranged so that it is normally spaced from the seat and is adapted to be operated into engagement with the seat. When the valve is operated into engagement with the seat 35 the passage through the piston is closed so that the fluid entering the cylinder forces the piston longitudinally through the cylinder. Pressure develops on the fluid the instant the valve closes. It will be obvious that movement of the piston 29 results in the corresponding movement of the brake actuating rod 14ª. In the simple or diagrammatic arrangement illustrated, the stem 31 of the valve 30 is directly connected with the foot pedal 13 so that the valve may be moved into engagement with the seat 35 by depressing the foot pedal. It will be obvious that the piston will be operated through the cylinder so long as the valve 30 is in engagement with the seat 35. Whenever the valve 30 stops movement, that is, whenever the operator stops depressing the pedal, the fluid under pressure in the cylinder advances the piston enough to allow escape of fluid between the valve and the seat. In practice suitable spring means, or the like, such as are ordinarily employed in brake systems may operate to normally return the piston to the unactuated position. Closing of the valve in the manner described does not interfere with the circulation of fluid through the system.

The fluid-pressure actuated unit C provided for actuating the steering gear may be connected with or in the steering gear in various manners. For purpose of example I have shown a cylinder and piston type of mechanism connecting the arm 17 and the drag link 18ª. The unit C is such that fluid under pressure normally circulates through it without causing operation of the gear. The unit illustrated in the drawings includes, generally, a cylinder 55 connected with the drag link 18ª, a piston 56 in the cylinder and connected with a stationary part such as the vehicle frame by a rod 57 extending through one end of the cylinder, and a control valve 58 controlling the circulation of fluid between the inlet 50 and outlet 51 so that fluid is admitted to either end of the cylinder depending upon the direction in which the valve is operated. A mechanism of this general type is set forth and claimed in my co-pending application entitled Fluid controls, Serial No. 400,712.

The conduit 36 and the conduit 37 form a means which connects the units B and C in series with the pump. The conduit 36 connects the discharge of the pump with the intake of the unit B as above described, while the conduit 37 connects the discharge of the unit B with the intake of the unit C. From the foregoing description it will be obvious that this connecting means operates to connect the units B and C with the pump so that fluid which is constantly circulated by the pump normally circulates through the unit B and then through the unit C. It is to be particularly noted, however, that closing of the valve 30 of the unit B results in an immediate building up or development of pressure in the conduit 36 and the intake end of the cylinder 28. In accordance with the present invention the unit C, which is the second unit in the series, is made operative or is supplied with fluid under pressure even though the first unit, that is the unit B, is in operation. Operation of the unit B does not stop circulation of the fluid to the second unit C. In case the valve of the first unit is operated to completely stop circulation in the first unit, the by-pass E operates or opens so that fluid is delivered around or past the unit B to the second unit C.

The present invention provides the by-pass E between the conduit 36 and the conduit 37 which by-pass may be in the nature of a fluid conduit 40 connecting the conduits 36 and 37, and a pressure relief valve 41 in the conduit 40. The relief valve 41 may be of any suitable form or type operating to normally prevent flow through the conduit 40 from the conduit 36 to the conduit 37 but operable or releasable at a predetermined pressure to allow such flow. In other words, the relief valve 41 operates to normally direct the circulation of fluid through the unit B, but in the event that the unit B stops the flow or circulation and sufficient pressure is developed on the fluid by the pump 20, the valve 41 opens allowing fluid from the pump to circulate around the unit B and directly to the unit C at the same time that pressure is maintained on the unit B. In practice the relief valve 41 may be an adjustable valve and may be set to operate at a predetermined pressure, thus acting as a safety valve limiting the pressure that can be developed in the unit B.

The door actuating unit includes, generally, a cylinder 80, a piston 81 operable in the cylinder, a piston rod 82 connected with the piston and operatively connected with the door 19 through a suitable link 83, or the like, a manually operable control valve 84, and various fluid connections about to be described.

The control valve 84 is supplied with fluid from the outlet opening 51 of the unit C through a conduit 38 and has connections 85 and 86 with the two ends of the cylinder. The valve 84 may be an ordinary control valve operable to allow fluid from the conduit 38 to enter either of the conduits connected with the cylinder 80 while fluid is allowed to escape through the other conduit connected with the cylinder to a conduit 87. Through the control valve the flow of fluid in the unit D can be controlled so that the piston 81 is operated in either direction in the cylinder 80, causing the door 19 to be opened or closed. The by-pass $E^1$ in connection with the fluid pressure actuated unit C is connected between the conduits leading to and from the unit C the same as the by-pass E is related to the conduits leading to and from the unit B. The by-pass $E^1$ may include a conduit $40^a$ connected between the conduits 37 and 38 and a relief valve $41^a$ in the conduit $40^a$. The by-pass $E^1$ functions the same as the by-pass E in that it allows fluid to by-pass around the unit C so that it circulates directly from the unit B to the unit D in the event that a condition develops in the unit C preventing circulation through the unit C. It will be obvious, of course, that pressure is maintained on the unit C whenever the by-pass $E^1$ operates.

The conduit 87 connected with the outlet of the control valve 84 connects with a pressure regulating valve or device 11 which functions to maintain a given pressure on the fluid in the conduit 87 allowing any excess fluid to escape to an overflow conduit 89. The pressure regulating device 11 may be a suitable regulating valve suitably adjusted or regulated to maintain the desired pressure on the fluid in the conduit 87. The fluid passed by the regulating device 11 at the predetermined pressure is conducted by means of a conduit 90 to the lubricating system of the engine A so that the engine is continuously supplied with a lubricating fluid at a predetermined pressure. The overflow from the pressure regulating device may be conducted by the overflow conduit 89 directly to the crank case 14 of the motor.

The by-pass means $E^2$ is related to the unit D the same as the by-pass units above described are related to the other units. The by-pass $E^2$ may include a conduit $40^b$ connected between the conduit 38 delivering fluid to the unit D and the conduit 87 conducting fluid from the unit D, and a relief valve $41^b$ may be provided in the conduit $40^b$. From the foregoing description of the by-passes E and $E^1$ the functioning of the by-pass $E^2$ will be readily understood.

From the foregoing description it will be obvious how the fluid handled by the pump 20 is circulated to or through the series of units above described so that the fluid is normally only under the pressure established by the pressure regulating device 11. Whenever one of the units is operated the normal circulation of the fluid is changed to the extent that additional pressure develops on the pump 20 sufficient to operate the unit. Upon full operation of a unit or operation such as might develop an excessive pressure or interrupt proper circulation through the system, the by-pass means functions so that circulation is at all times maintained throughout the system. It is to be pointed out that the system may embody any number of fluid pressure actuated units, it being obvious from the foregoing description of how a series of such units may be related to carry out the principles of the invention. Particular attention is called to the fact that, regardless of how many units there may be included in a system embodying the invention, the pressure against which the pump operates will normally be only that established by the pressure regulating valve 11, additional pressure occurring only when one or more of the units are operated.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In a motor vehicle, an internal combustion engine having a case carrying lubrication fluid and a lubrication system, a fluid pressure actuated unit, a pump operating to deliver lubricating fluid from said case to the lubricating system of the engine through said unit, and a pressure regulating valve connected between said unit and the engine governing the pressure at which the fluid is delivered from said unit to the lubricating system of the engine and operable to by-pass excess fluid pressure to the case.

2. In a motor vehicle, an internal combustion engine having a case carrying lubrication fluid and a lubrication system, a plurality of fluid pressure actuated units connected in series, a pump circulating fluid from said case to the lubricating system of the engine through the series of units, a pressure regulating valve between the series of units and the engine, and a conduit connecting said valve to the case operable to by-pass excess fluid from the valve to the case.

3. In a motor vehicle, an internal combustion engine having a lubricating system and a case carrying lubrication fluid, a plurality of fluid pressure actuated units connected in series, a pump circulating fluid from said case to the lubricating system of the engine through the series of units, and by-passes in connection with the units whereby fluid is by-passed around a unit upon pressure in the unit exceeding a predetermined amount.

4. In a motor vehicle, an internal combustion engine having a lubricating system, a plurality of fluid pressure actuated units connected in series, a pump circulating fluid to lubricating system of the engine through the series of units, a by-pass in connection with each unit to allow fluid to pass the unit upon pressure in the unit exceeding a predetermined amount, and pressure regulating means between the series of units and the engine.

5. In a motor vehicle, an internal combustion engine having a lubricating system, a plurality of fluid pressure actuated units connected in series, one of the units being a servomotor, a pump circulating fluid to the lubricating system of the engine through the series of units, a valve between the series of units and the engine regulating the pressure at which the fluid is delivered to the lubricating system of the engine from the series of units, and a by-pass in connection with each unit to allow fluid to pass the unit upon pressure in the unit exceeding a predetermined amount.

6. In a motor vehicle, an internal combustion engine having a case carrying lubricating fluid, and having a lubricating system, a plurality of fluid pressure actuated units connected in series, a pump circulating fluid to the lubricating system of the engine through the series of units, a valve between the series of units and the engine regulating the pressure at which the fluid is delivered to the lubricating system of the engine from the series of units operable to by-pass excess fluid pressure to the case, and a by-pass in connection with each unit to allow fluid to pass the unit upon pressure in the unit exceeding a predetermined amount, the suction of the pump being connected with the case of the engine so that the pump handles fluid from the engine.

In witness that I claim the foregoing I have hereunto subscribed my name this 24th day of March, 1930.

HARRY F. VICKERS.